Dec. 29, 1936.  R. RAVELO  2,066,122

VALVED COUPLING

Filed Oct. 24, 1935

Inventor
Raimundo Ravelo

By  *signature*
Attorney

Patented Dec. 29, 1936

2,066,122

UNITED STATES PATENT OFFICE 2,066,122

VALVED COUPLING

Raimundo Ravelo, Ferrum, Va.

Application October 24, 1935, Serial No. 46,576

2 Claims. (Cl. 137—69)

This invention relates to valved couplings and more particularly to check valves in pipe couplings and pipe unions which will be insured of closing to the backward passage of either liquid or gaseous fluids.

An object of the invention is to provide an improved valve structure provided with means for more positively seating the valve in its closing direction and to provide a freer passage for the fluid passing through it in the other direction.

Another object is to provide such a valve in a pipe union or coupling.

Further objects, details and advantages of the invention will appear in the following description and in conjunction with the accompanying drawing in which—

Figure 1:
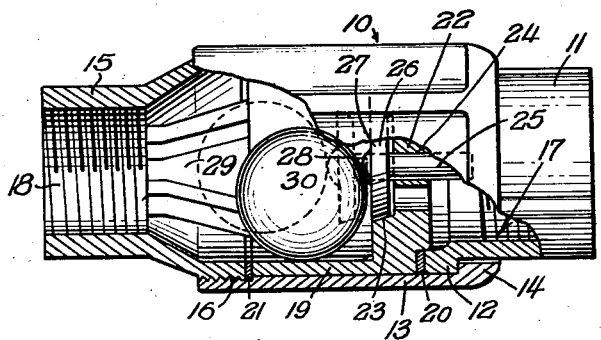
Figure 1 is a side elevation partially in longitudinal section joining a pipe union and check valve in accordance with my invention.
Figure 2:
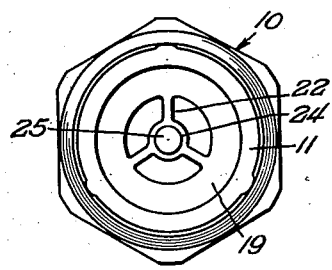
Figure 2 is an elevation of the right hand end or entrance end of the union and valve shown in Figure 1.
Figure 3:
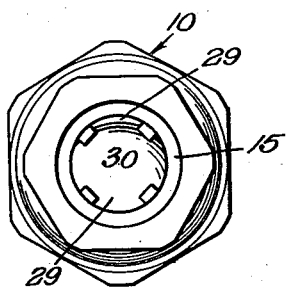
Figure 3 is an elevation of the other or exit end thereof.

Referring to Figure 1 the pipe union 10 comprises an entrance end member 11 having an enlarged peripheral flange 12 at its inner end upon which a union coupling 13 having an internal flange 14 for engagement with flange 12 is adapted to swivel. The union 10 also has an exit end member 15 and this is connected with the union coupling member 13 by threaded joints 16 in the usual manner. End members 11 and 15 are internally threaded at 17 and 18 respectively in the usual manner for connection with the ends of pipes, the pipe union is adapted to join.

Within the union 10 is a cylindrical member 19 having a sliding fit in the union coupling 13 and secured in a fixed relationship therein between washer members such as leather or the like 20 and 21 which engage the innermost ends of the end members 11 and 15 so that when the union coupling member 13 is screwed up tight this member 19 is secured in fixed position and the joints are fluid tight.

Cylindrical member 19 at the end of the union 10 toward the entrance is provided with a valve cage 22 and an inclined annular valve seat 23. The central opening 24 of this valve cage is provided in which a valve stem 25 of a valve 26 is guided and permitted to reciprocate freely.

Valve 26 has a head 27 with an inclined annular surface adapted to seat on the valve surface 23 of the valve cage and form a fluid tight seal therewith. This valve head is also provided with a projection 28 preferably of spherical formation and at the center thereof.

The pipe union end member 15 on its interior is formed conical and provided with a plurality of channels 29 affording passageways for fluid passing through the structure. Also within the union is a spherical ball member 30 which is freely movable and may either occupy the full line position or be moved by valve member 26 to the dotted line position within the conical portion of end 15 by the passage of fluid through the union. It will be noted that this ball member insures the proper seating of the valve member 26 so that the seating surface of the valve head and valve cage are closed fluid tight. The member 30 engages the spherical projection 28 on the valve member 26 and tends to force it upward so that the valve member seats firmly, even though its stem 25 may be somewhat loose in the opening 24 of the valve cage.

Figure 4:
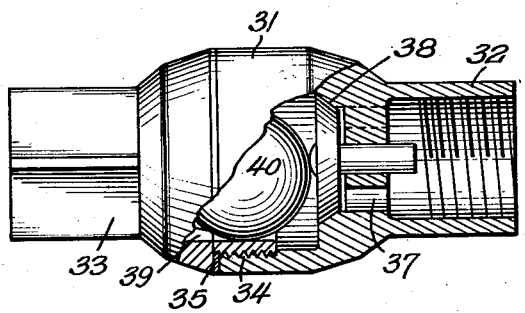
Figure 4 is a side elevation partly in longitudinal section of a pipe coupling employing a check valve in accordance with my invention.
Figure 5:
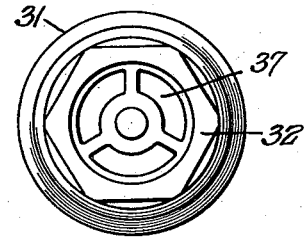
Figure 5 is an elevation of the entrance end of said valved coupling shown in Figure 4.

Referring to Figure 4 showing a pipe coupling, the arrangement of the check valve is substantially the same as that in the union. In this construction coupling member 31 comprises two parts only, an internally threaded entrance end 32 and an exit end 33 which is similarly internally threaded so that two pipes may be connected thereby. These end members 32 and 33 have polygonal exterior conformations for receiving wrenches for turning them on the respective pipes which they are to connect and are secured together by screw threaded joint 34 so that they abut an annular washer 35 to produce a fluid tight joint. In this arrangement the valve member 36 is the same as valve member 35 but the valve cage and seat 37 and 38 respectively are formed integrally with the entrance end 32 of the coupling. End 33 of the coupling is provided with the conical interior having channels 39 in the same manner as end member 15 of union 10. This coupling member also encloses a spherical ball member 40 the same as ball 30 in the union 10 and the operation of the check valve in this pipe coupling is the same as that in the pipe union 10.

The check valve illustrated in both the union and pipe coupling forms operates in the same manner. The valve in the union is preferable since the union permits a disconnection of the coupling without the necessity of removing the pipes or disconnecting either of the ends 11 or 15 by merely turning the universal coupling member 13 until the threaded joint 16 is opened so that it can slide back over the end 11 of the union 10 and permit the cylindrical member 19 which carries the valve cage, also the valve members to be entirely removed or replaced.

In either form the coupling member is adapted for use in either horizontal or vertical position and naturally if in a vertical position or sloping position it is operable only to check a backward flow in a normally ascending flow of liquid through the conductors or pipes.

It will be obvious to those skilled in the art that various changes may be made in my device without departing from the spirit of the invention and therefore I do not limit myself to what is shown in the drawing and described in the specification, but only as indicated by the appended claims.

I claim:

1. In combination, a pipe union comprising a pair of threaded pipe receiving end members, a union connector mounted to swivel on one of said end members and having a threaded joint connection with the other end member, a cylindrical member mounted in said union connector and held therein between the inner ends of said end members, said cylindrical member having a valve cage and valve seat at one end thereof, a valve member in said cylindrical member cooperating with said valve cage and seat, said valve having a central projection thereon, and a spherical ball member also in said cylindrical member cooperating with the projection on the valve member insuring the proper seating of the valve in the valve seat.

2. A pipe coupling having a cylindrical interior, a valve seat therein, a valve adapted to seat on said valve seat, a central projection on a face of said valve, and a spherical ball loosely positioned in said cylindrical interior adapted to engage therewith and cooperate with the projection on the valve to insure a force applied centrally thereto in effecting its seating in said valve seat.

RAIMUNDO RAVELO.